US008570910B2

(12) United States Patent
Iwai et al.

(10) Patent No.: US 8,570,910 B2
(45) Date of Patent: Oct. 29, 2013

(54) WIRELESS TRANSMISSION APPARATUS AND WIRELESS TRANSMISSION METHOD

(75) Inventors: Takashi Iwai, Ishikawa (JP); Katsuhiko Hiramatsu, Kanagawa (JP); Kenichi Miyoshi, Kanagawa (JP); Yoshihiko Ogawa, Kanagawa (JP); Tomofumi Takata, Ishikawa (JP)

(73) Assignee: Panasonic Corporation, Osaka (JP)

( * ) Notice: Subject to any disclaimer, the term of this patent is extended or adjusted under 35 U.S.C. 154(b) by 236 days.

(21) Appl. No.: 12/997,228

(22) PCT Filed: Jun. 19, 2009

(86) PCT No.: PCT/JP2009/002792
§ 371 (c)(1),
(2), (4) Date: Jan. 18, 2011

(87) PCT Pub. No.: WO2009/153998
PCT Pub. Date: Dec. 23, 2009

(65) Prior Publication Data
US 2011/0170502 A1    Jul. 14, 2011

(30) Foreign Application Priority Data

Jun. 20, 2008   (JP) ................................ 2008-162091

(51) Int. Cl.
*H04L 12/16* (2006.01)
(52) U.S. Cl.
USPC ........... 370/260; 370/334; 370/339; 370/208; 370/343
(58) Field of Classification Search
USPC .......... 370/329, 330, 334, 343, 208, 339, 260
See application file for complete search history.

(56) References Cited

U.S. PATENT DOCUMENTS

| | | | |
|---|---|---|---|
| 5,666,654 A * | 9/1997 | Kanai | 455/512 |
| 7,142,548 B2 * | 11/2006 | Fong et al. | 370/395.4 |
| 7,715,492 B2 * | 5/2010 | Seki | 375/295 |
| 7,746,763 B2 * | 6/2010 | Fruhauf et al. | 370/208 |

(Continued)

FOREIGN PATENT DOCUMENTS

| | | |
|---|---|---|
| WO | 2008/081876 | 7/2008 |
| WO | 2009/069630 | 6/2009 |

OTHER PUBLICATIONS

NEC; ( "R1-083011: Uplink Access Scheme for LTE-Advanced in BW+<20MHz"); Aug. 2008; 3GPP TSG RAN 1#54; pp. 1-16.*
International Search Report dated Aug. 18, 2009.

(Continued)

*Primary Examiner* — Ricky Ngo
*Assistant Examiner* — Dewanda Samuel
(74) *Attorney, Agent, or Firm* — Dickinson Wright PLLC (57) ABSTRACT

In DFT-s-OFDM, disclosed are a wireless transmission apparatus and wireless transmission method whereby freedom of allocation of frequencies is secured, while increases of CM are avoided. An SD number determination unit (152) determines an SD number based on the channel quality information of a mobile station and a threshold value that is set by a threshold value setting unit (151). A transmission bandwidth determination unit (153) determines the transmission bandwidth necessary for transmission of the transmission data. An allocation commencement position determination unit (154) determines the position for commencement of allocation of transmission data. If the SD number is equal to or more than the threshold value, a divided bandwidth determination unit (155) sets all the divided bandwidths to equal values and a frequency interval determination unit (156) sets all the frequency intervals to equal values.

9 Claims, 12 Drawing Sheets

(56) References Cited

U.S. PATENT DOCUMENTS

| | | | |
|---|---|---|---|
| 7,933,350 B2* | 4/2011 | Liu et al. | 375/260 |
| 8,175,177 B2* | 5/2012 | Wang | 375/260 |
| 2007/0159993 A1* | 7/2007 | Classon et al. | 370/319 |
| 2007/0189199 A1* | 8/2007 | Nishio | 370/328 |
| 2007/0230405 A1* | 10/2007 | Yin et al. | 370/335 |
| 2008/0181318 A1* | 7/2008 | Kim et al. | 375/260 |
| 2008/0240275 A1* | 10/2008 | Cai | 375/260 |
| 2009/0168711 A1* | 7/2009 | Fukuoka et al. | 370/329 |
| 2010/0046480 A1* | 2/2010 | Kawamura et al. | 370/335 |
| 2010/0098177 A1 | 4/2010 | Hamaguchi | |
| 2010/0254484 A1 | 10/2010 | Hamaguchi | |
| 2010/0273515 A1* | 10/2010 | Fabien et al. | 455/509 |

OTHER PUBLICATIONS

3GPP TSG RAN WG1 #44 Meeting, "Channel dependent scheduling in E-UTRA uplink and Text Proposal," Nokia, R1-060295, Feb. 2006, pp. 1-4.

H. Namba, et al., "A Study on Dynamic Spectrum Control Considering PAPR," Proceedings of the 2008 IEICE General Conference, B-5-50, Mar. 2008, pp. 436.

T. Inoue, et al., "Performance Evaluation on Cubic Metric of Reference Signal in Discontinuous Spectrum Transmission," Proceedings of the 2008 IEICE Society Conference, B-5-21, Sep. 2008, pp. 334.

3GPP TSG-RAN1 #54bis, "Short study on PAPR property of clustered DFT-S-OFDM," Fujitsu, R1-083781, Sep. 29-Oct. 3, 2008, pp. cover p. and 1-14.

3GPP TSG-RAN1 #54bis, "PAPR of UL access schemes," Fujitsu, R1-083780, Sep. 29-Oct. 3, 2008, pp. 1-6.

3GPP TSG RAN WG1 Meeting #54bis, "Frequency Diversity and PAPR results for Uplink MA for LTE-Advanced," Sharp, R1-083497, Sep. 29-Oct. 3, 2008, pp. 1-5.

3GPP TSG-RAN WG1#55bis, "Remaining issues on the Uplink transmission scheme," Sharp, R1-090021, Jan. 2009, pp. 1-5.

3GPP TSG RAN WG1 Meeting #55, "System performance of uplink non-contiguous resource allocation," Panasonic, R1-084224, Nov. 2008, pp. 1-5.

3GPP TSG RAN WG1 Meeting #55, "Comparison between Clustered DFT-s-OFDM and OFDM for supporting non-contiguous RB allocation within a component carrier," Panasonic, R1-084225, Nov. 2008, pp. 1-7.

3GPP TSG RAN1#53, "Proposals on PHY related aspects in LTE Advanced," NEC, R1-081752, May 2008, pp. 1-12.

K. Mashima, et al., "A Study on Broadband Single Carrier Transmission Technique using Dynamic Spectrum Control," IEICE Technical Report, vol. 106, No. 480, RCS2006-233, Jan. 2007, pp. 97-102.

* cited by examiner

| PHR[dB]<br>(MARGIN OF<br>TRANSMISSION POWER) | THRESHOLD FOR NUMBER OF SD'S |
|---|---|
| 6db < PHR | MAXIMUM NUMBER OF SD'S |
| 4dB < PHR ≦ 6dB | 8 |
| PHR ≦ 4dB | 3 |

FIG.11

| STREAM MULTIPLEXING BEFORE<br>TRANSMISSION POWER AMPLIFIER | THRESHOLD FOR NUMBER OF SD'S |
|---|---|
| PRESENCE OF MULTIPLEXING | 3 |
| NON-PRESENCE OF MULTIPLEXING | 4 |

FIG.12

| MODULATION SCHEME | THRESHOLD FOR NUMBER OF SD'S |
|---|---|
| 64QAM | 3 |
| 16QAM | 3 |
| QPSK | 4 |
| BPSK | 4 |

FIG.13

| TRANSMISSION BANDWIDTH BW | THRESHOLD FOR NUMBER OF SD'S |
|---|---|
| 10MHz < BW | 3 |
| BW ≦ 10MHz | 4 |

WIRELESS TRANSMISSION APPARATUS AND WIRELESS TRANSMISSION METHOD

TECHNICAL FIELD

The present invention relates to a radio transmission apparatus and radio transmission method using a DFT-s-OFDM (Discrete Fourier Transform spread Orthogonal Frequency Division Multiple Access) scheme.

BACKGROUND ART

In LTE-Advanced, which is an enhanced version of 3GPP LTE (3rd Generation Partnership Project Long Term Evolution), a transmission method of switching between single carrier transmission and multicarrier transmission in an uplink, has been studied (e.g. see Non-Patent Literature 1).

An advantage of multicarrier transmission is that the degree of freedom of frequency allocation improves compared to single carrier transmission (transmission with consecutive frequency bands), so that frequency scheduling gain is obtained. In contrast, a disadvantage of multicarrier transmission is that PAPR (Peak-to-Average Power Ratio) indicating a ratio of peak to average power of a transmission signal, and CM (Cubic Metric), increase compared to single carrier transmission. Consequently, upon performing multicarrier transmission, it is necessary to provide larger power amplifier back-off for transmitting a transmission signal without distortion. Thus, in multicarrier transmission, the actually transmissible maximum power becomes smaller, and therefore coverage performance tends to degrade. Especially, if OFDMA with large CM (or PAPR) is used as multicarrier transmission, coverage performance degrades significantly.

Therefore, studies are underway to provide advantages of single carrier transmission and multicarrier transmission by adaptively switching between single carrier transmission and multicarrier transmission according to the communication environment of mobile stations. As such a transmission method, there is DFT-s-OFDM-with-SDC (Spectrum Division Control) disclosed in Non-Patent Literature 1.

Figure 1:
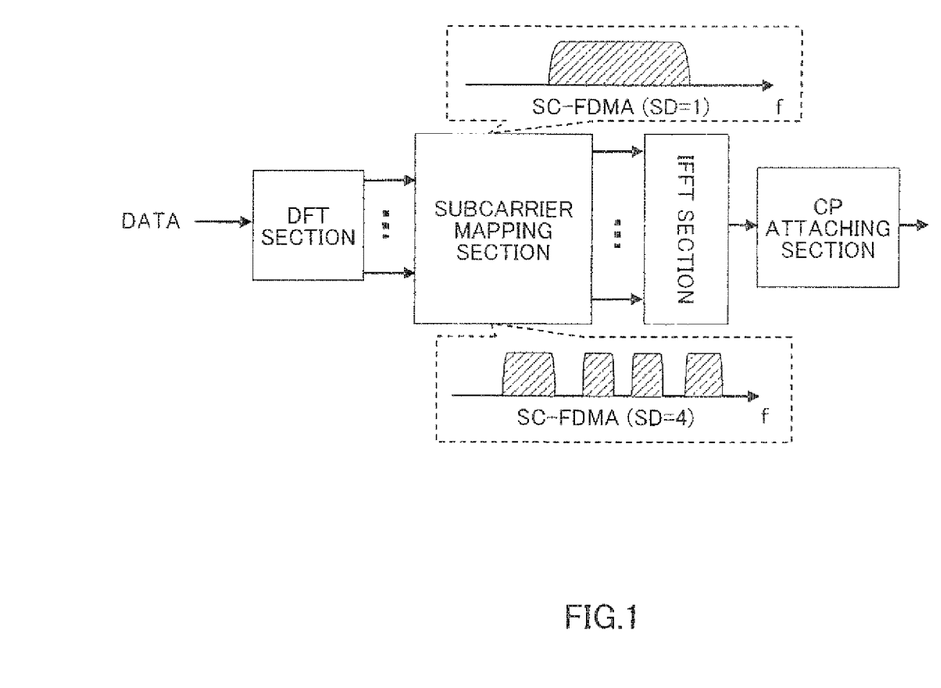
FIG. 1 is a block diagram showing an outline configuration of a transmission apparatus of a DFT-s-OFDM-with-SDC scheme.

FIG. 1 is a block diagram showing an outline configuration of a transmission apparatus of the DFT-s-OFDM-with-SDC scheme. As shown in FIG. 1, this transmission apparatus performs DFT processing of a data signal and maps this data signal after DFT, in the frequency domain. The mapped data signal is subjected to IFFT (Inverse Fast Fourier Transform) processing, attached a CP (Cyclic Prefix) and then transmitted. The subcarrier mapping section shown in FIG. 1 controls a method of mapping a data signal in the frequency domain, so that it is possible to switch between single carrier transmission and multicarrier transmission. To be more specific, single carrier transmission is used when the number of data divisions (hereinafter "SD (Spectrum Division) count") in the frequency domain is 1, or multicarrier transmission is used when the number of SD's is equal to or greater than 2. A base station controls the number of SD's according to the communication environment of mobile stations, so that it is possible to adaptively switch between single carrier transmission and multicarrier transmission.

Also, an advantage of DFT-s-OFDM-with-SDC is that it is possible to reduce CM (or PAPR) upon multicarrier transmission compared to OFDMA. By this means, it is possible to widen an application range of multicarrier transmission and improve coverage performance.

CITATION LIST

Non-Patent Literature

NEC, R1-081752, "Proposals on PHY related aspects in LTE Advanced", 3GPP TSG RAN1#53, Kansas City, Mo., USA, 5-9 May, 2008

SUMMARY OF INVENTION

Technical Problem

However, the above DFT-s-OFDM-with-SDC has a problem that CM increases when the number of SD's increases. This problem will be explained below briefly.

Figure 2:
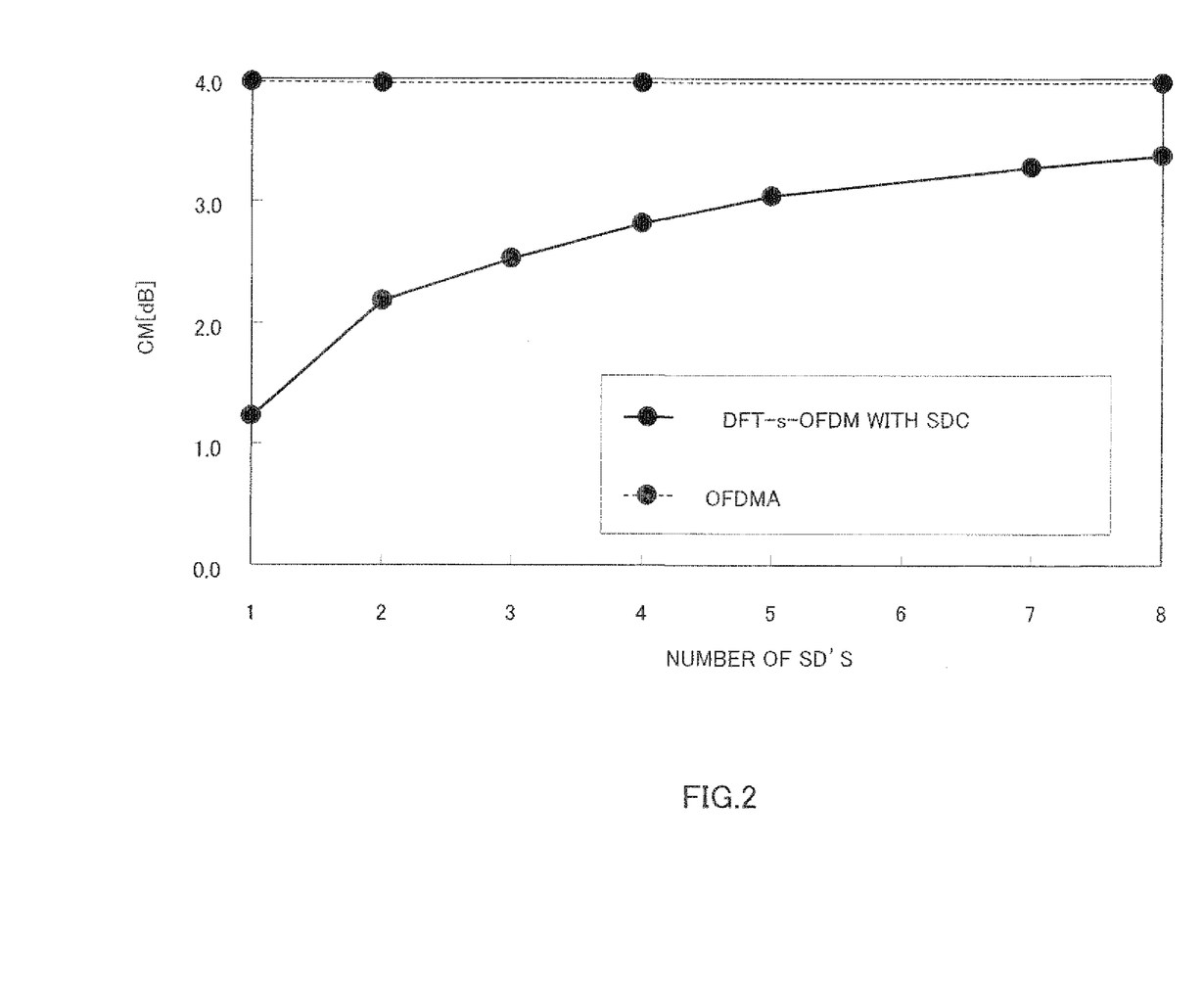
FIG. 2 shows a relationship between the number of SD's and CM upon using QPSK.

FIG. 2 shows the relationship between the number of SD's and CM upon using QPSK. Referring to FIG. 2, it is recognized that CM [dB] increases when the number of SD's increases in DFT-s-OFDM-with-SDC (solid line). In contrast, in OFDMA (dotted line), CM has a large value of 4 dB regardless of the number of SD's. When the number of SD's is 5 or more, the difference between DFT-s-OFDM-with-SDC and OFDMA is within 1 dB.

Therefore, if an increase in CM is suppressed, the usable number of SD's is limited, and therefore the degree of freedom of frequency allocation degrades. For example, if CM is suppressed to 2.5 dB or less, referring to FIG. 2, the usable number of SD's is limited to 3 or less. Also, if a large number of SD's is secured to provide the degree of freedom of frequency allocation, CM increases and coverage performance degrades.

It is therefore an object of the present invention to provide a transmission apparatus and transmission method for suppressing an increase in CM and securing the degree of freedom of frequency allocation in DFT-s-OFDM.

Solution to Problem

The radio transmission apparatus of the present invention employs a configuration having: a scheduling section that allocates frequency such that a plurality of bandwidths of division bands, in which the transmission data is divided in the frequency domain, are all equal, and intervals between the plurality of the division bands are all equal, when a number of the division bands to divide and allocate transmission data of a communicating party in a frequency domain is equal to or greater than a threshold in a discrete Fourier transform spread orthogonal frequency division multiple access scheme, and generates data allocation information including an allocation result; and a transmission section that transmits the generated data allocation information.

The radio transmission method of the present invention includes: a scheduling step of, when a number of divisions to divide and allocate transmission data of a communicating party in a frequency domain is equal to or greater than a threshold in a discrete Fourier transform spread orthogonal frequency division multiple access scheme, allocating frequency such that a plurality of bandwidths of the division bands, in which the transmission data is divided in the frequency domain, are all equal, and intervals between the plurality of bandwidths of the division bands are all equal, when a number of the division bands to divide and allocate transmission data of a communicating party in a frequency domain is equal to or greater than a threshold in a discrete Fourier transform spread orthogonal frequency division multiple access scheme, and generating data allocation information including an allocation result; and a transmission step of transmitting the generated data allocation information.

Advantageous Effects of Invention

According to the present invention, it is possible to suppress an increase in CM and secure the degree of freedom of frequency allocation in DFT-s-OFDM.

DESCRIPTION OF EMBODIMENTS

Now, embodiments of the present invention will be explained in detail with reference to the accompanying drawings. Here, in embodiments, components of the same function will be assigned the same reference numerals and overlapping explanation will be omitted.

Embodiment 1

Figure 3:
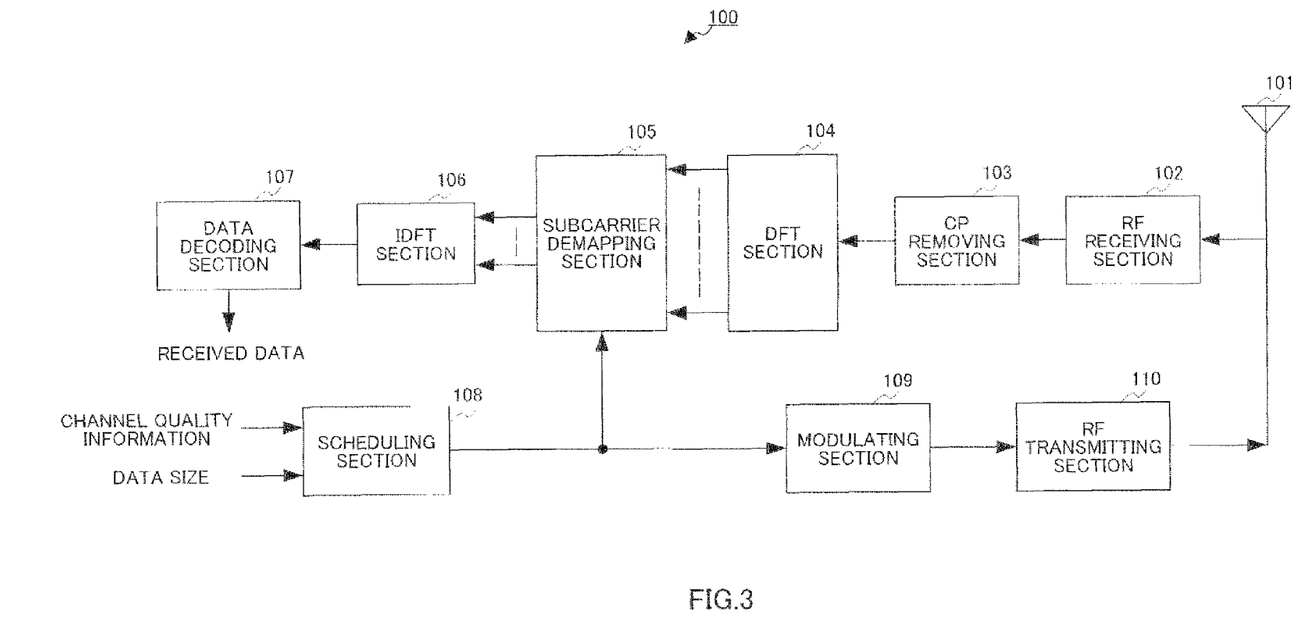
FIG. 3 is a block diagram showing a configuration of a base station according to Embodiment 1 of the present invention.

FIG. 3 is a block diagram showing a configuration of base station 100 according to Embodiment 1 of the present invention. The configuration of base station 100 will be explained below in detail using FIG. 3.

RF receiving section 102 receives a signal transmitted from a mobile station, via antenna 101, performs reception processing such as down-conversion and A/D conversion on the received signal and outputs the result to CP removing section 103.

CP removing section 103 removes the CP of the signal outputted from RF receiving section 102 and outputs the signal without a CP to DFT section 104.

DFT section 104 performs DFT processing of the signal outputted from CP removing section 103 and outputs a signal converted from the time domain to the frequency domain, to subcarrier demapping section 105.

Subcarrier demapping section 105 extracts received data corresponding to the frequency domain indicated by data allocation information outputted from scheduling section 108 (which will be described later) in the frequency domain signal outputted from DFT section 104, and outputs the received data extracted to IDFT (inverse Discrete Fourier Transform) section 106.

IDFT section 106 performs IDFT processing of the received data outputted from subcarrier demapping section 105 to convert the data into a time domain signal, and then outputs the signal to data decoding section 107.

Data decoding section 107 decodes the data outputted from IDFT section 106 and outputs decoded data as received data.

Figure 4:
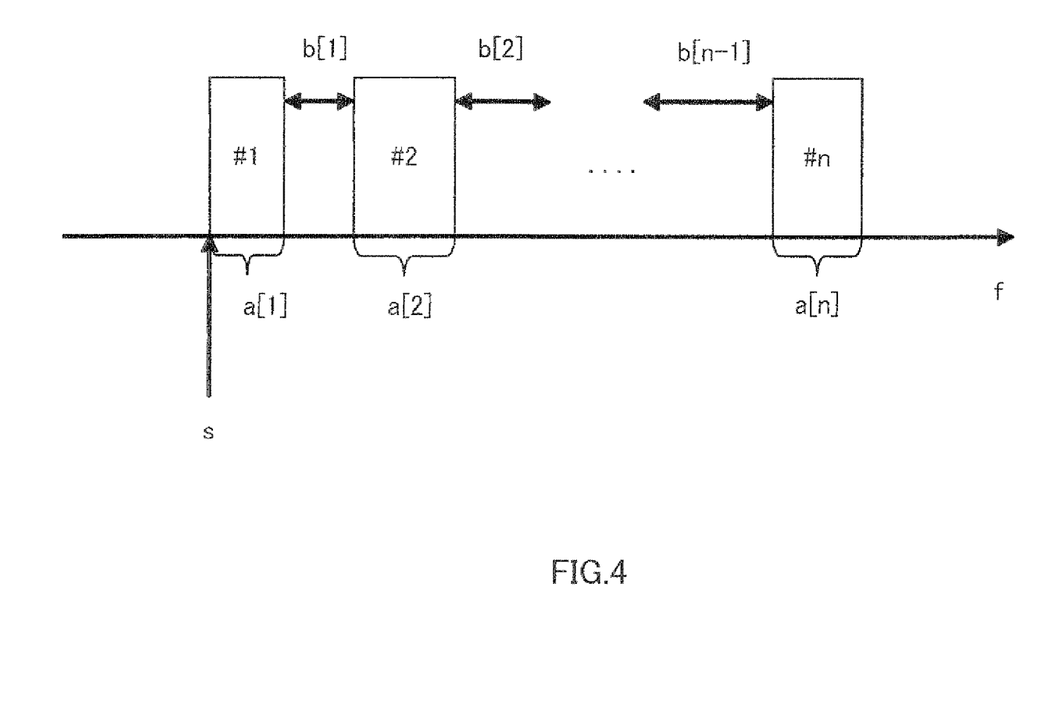
FIG. 4 illustrates data allocation information.

Scheduling section 108 generates data allocation information by performing scheduling based on channel quality information indicating the downlink quality measured by a mobile station and based on the desirable transmission data size for the mobile station. Referring to FIG. 4 for explanation, data allocation information represents the number of SD's (=n), allocation starting position (=s), division bandwidth (=a[1] to a[n]) and frequency interval (=b[1] to b[n−1]). Here, a division bandwidth means, for example, the number of consecutive resource blocks (including a single resource block) and a frequency interval means, for example, the interval between continuous resource blocks. Generated data allocation information is outputted to subcarrier demapping section 105 and modulating section 109. Also, scheduling section 108 will be described later in detail.

Modulating section 109 modulates the data allocation information outputted from scheduling section 108 and outputs a modulated signal to RF transmitting section 110.

RF transmitting section 110 performs transmission processing such as D/A conversion, amplification and up-conversion on the modulated signal outputted from modulating section 109, and outputs the result to a mobile station from antenna 101.

Figure 5A:
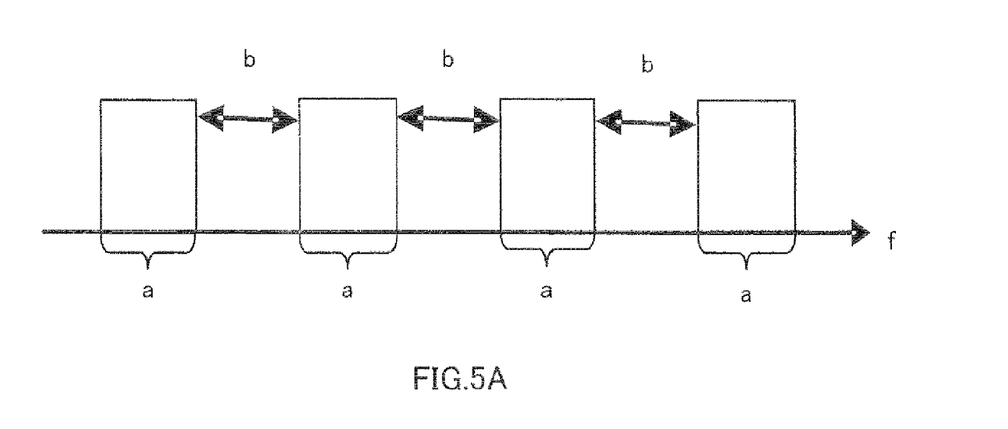
FIG. 5A illustrates uniform allocation.
Figure 5B:
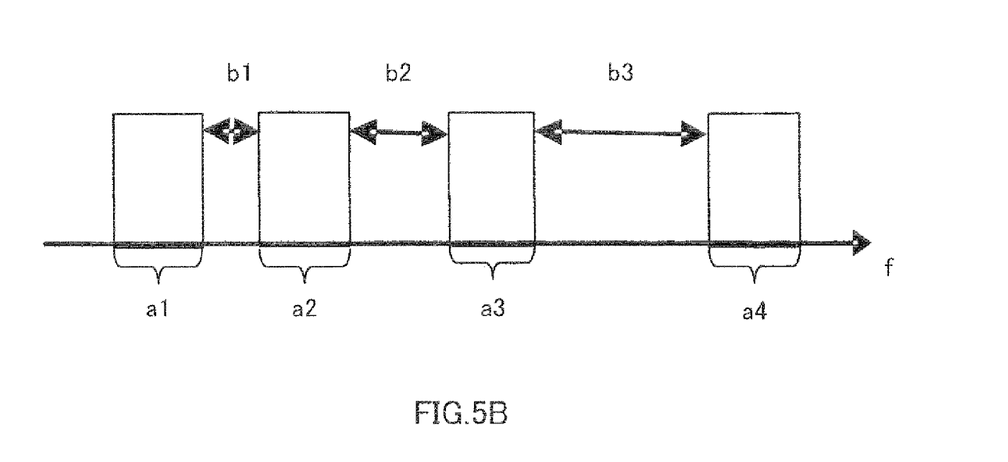
FIG. 5B illustrates nonuniform allocation.

Here, as shown in FIG. 5A, a state where the bandwidth (=a) of resource blocks is the same and the frequency interval (=b) between resource blocks is the same, will be referred to as "uniform allocation." Also, allocation different from the uniform allocation will be referred to as "nonuniform allocation." As shown in FIG. 5B, nonuniform allocation represents a state where assigned resource bandwidths (=a1, a2, a3, a4) are different or where frequency intervals (=b1, b2, b3) between resources are different.

Figure 6:
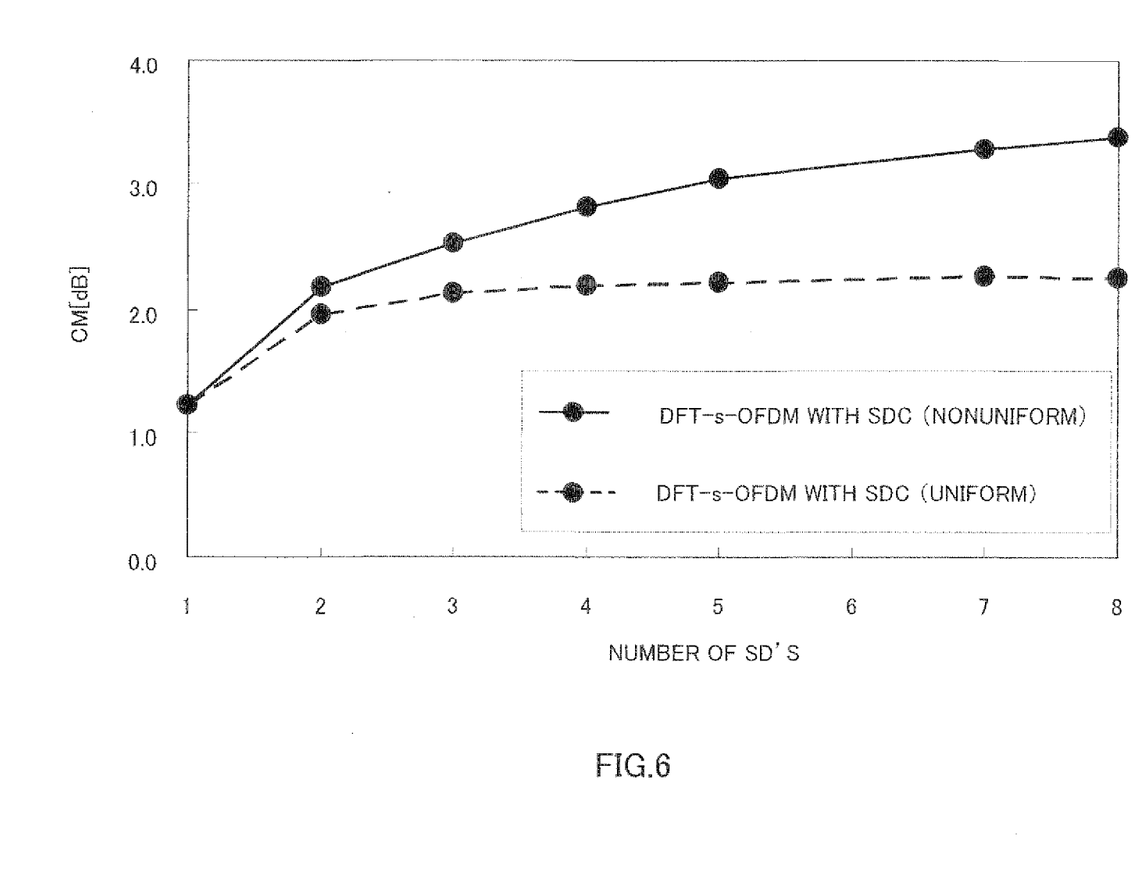
FIG. 6 shows a relationship between the number of SD's and CM.

FIG. 6 shows the relationship between the number of SD's and CM, obtained from a computer simulation. The solid line represents nonuniform allocation and the dotted line represents uniform allocation. Referring to FIG. 6, it is understood that CM increases when the number of SD's increases in the case of nonuniform allocation, while an increase in CM is suppressed even when the number of SD's increases in the case of uniform allocation. Especially, CM is substantially fixed at about 2.2 dB when the number of SD's is equal to or greater than 3, and therefore it is understood that CM does not increase substantially.

Figure 7:
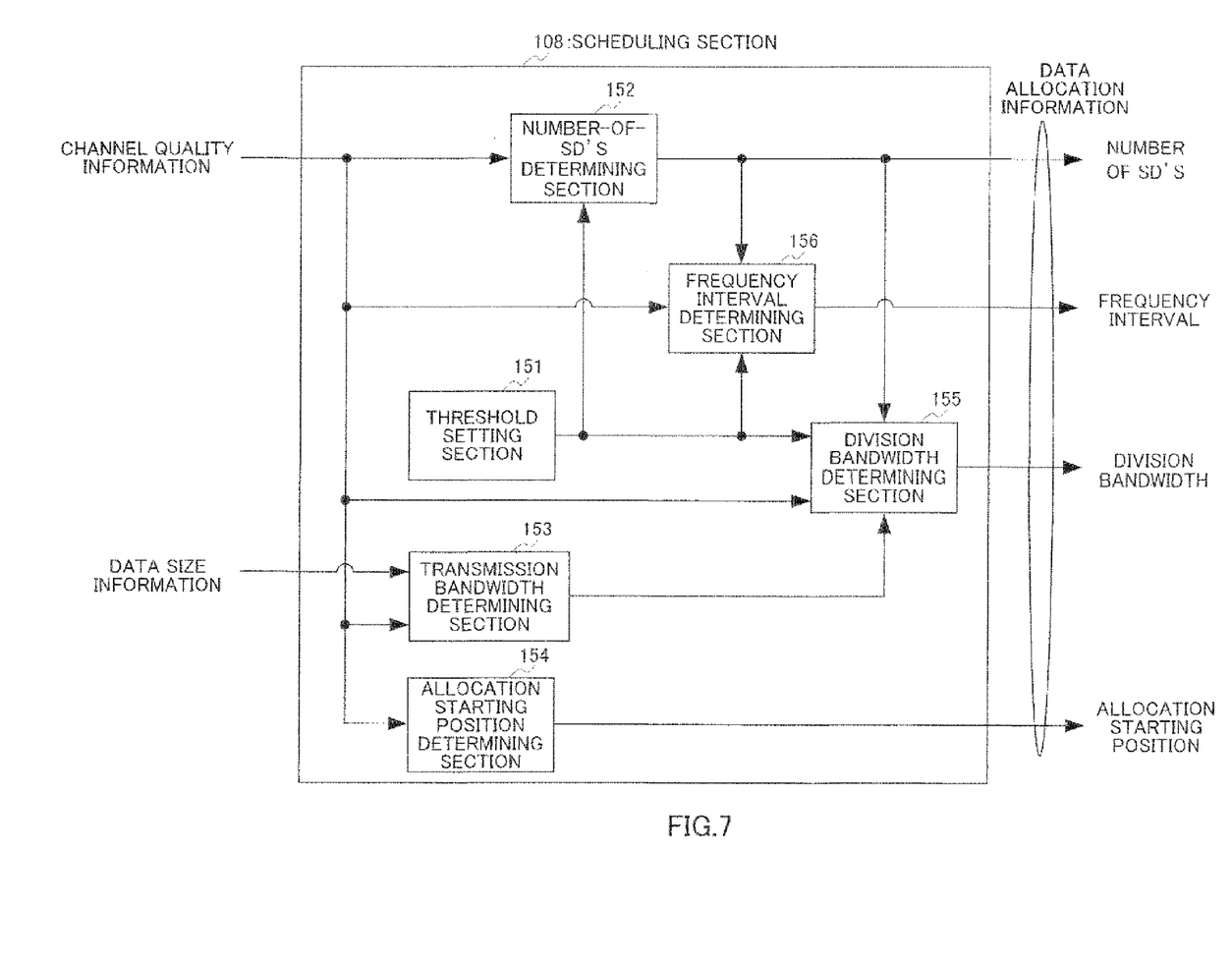
FIG. 7 is a block diagram showing a configuration inside the scheduling section shown in FIG. 3.

Next, scheduling section 108 will be explained in detail. FIG. 7 is a block diagram showing a configuration inside scheduling section 108 shown in FIG. 3. In this figure, threshold setting section 151 sets a threshold for the number of SD's in number-of-SD's determining section 152, division bandwidth determining section 155 and frequency interval determining section 156. For example, a threshold is determined in advance in a system, and threshold setting section 151 is designed to hold the determined threshold. To be more specific, seen from the relationship between the number of SD's and CM shown in FIG. 6, CM does not increase when the number of SD's is equal to or greater than 3 upon adopting uniform allocation, so that it is possible to minimize the maximum CM value in all numbers of SD's by setting "3" as a threshold. Also, it is equally possible to determine a threshold in each cell. That is, a threshold may be determined based on the maximum acceptable CM in a cell. For example, from the viewpoint of coverage performance, when CM of transmission data up to 2.8 dB is accepted, "3" is set as a threshold in view of the relationship shown in FIG. 6. Also, if a threshold is determined in each cell as above, the base station needs to report the threshold to mobile stations in the cell.

number-of-SD's determining section 152 determines the number of SD's based on mobile station channel quality information and a threshold set in threshold setting section 151. number-of-SD's determining section 152 determines the number of SD's based on, for example, the variation of channel quality of the mobile station in the time domain. To be more specific, as seen in a mobile station that moves at high speed, when channel quality changes fast in the time domain, frequency schedule gain cannot be expected. Consequently, the number of SD's equal to or greater than a threshold is determined to prioritize frequency diversity gain. When the number of SD's is equal to or greater than a threshold, by performing uniform allocation, it is possible to suppress an increase in CM even if the number of SD's increases, so that it is possible to maximize the frequency diversity effect by setting the largest number of SD's that can be divided out by the minimum allocation unit of the system.

In contrast, like a mobile station that moves at low speed, when channel quality changes slowly in the time domain, frequency schedule gain can be expected. Consequently, the number of SD's less than a threshold is determined to prioritize frequency scheduling gain is prioritized. Based on the channel quality of a mobile station, the number of SD's is set in which the maximum frequency scheduling gain is provided.

Transmission bandwidth determining section 153 determines the transmission bandwidth (before division) required to transmit transmission data, based on mobile station channel quality information and information of the desirable transmission data size for the mobile station, and outputs the determined transmission bandwidth to division bandwidth determining section 155.

Based on the mobile station channel quality information, allocation starting position determining section 154 determines the allocation starting position (=s), which is the starting position of frequency allocated to a mobile station, and outputs the determined allocation starting position as data allocation information.

Division bandwidth determining section 155 determines division bandwidths (the numbers of resource blocks) (=a[1] to a[n]), based on the number of SD's (=n) outputted from number-of-SD's determining section 152, the mobile station channel quality information, the threshold set in threshold setting section 151 and the transmission bandwidth (=BW) outputted from transmission bandwidth determining section 153.

To be more specific, when the number of SD's is equal to or greater than a threshold, division bandwidth determining section 155 sets the same value for all division bandwidths. For example, the division bandwidths are determined as shown in equation 1.

$$a[i]=BW/SD, \text{ where } i=1,2,\ldots,n \ (n \geq \text{threshold}) \quad \text{(Equation 1)}$$

In contrast, if the number of SD's is less than a threshold, division bandwidth determining section 155 determines division bandwidths that enable frequency scheduling gain to be maximized, based on mobile station channel quality information. That is, determined division bandwidths are not necessarily the same.

Frequency interval determining section 156 determines frequency intervals (=b[1] to b[n−1]) based on the number of SD's (=n) outputted from number-of-SD's determining section 152 and the threshold set in threshold setting section 151.

To be more specific, when the number of SD's is equal to or greater than a threshold, frequency interval determining section 156 sets the same value for all frequency intervals. By setting a higher value for frequency intervals, it is possible to maximize the frequency diversity effect. For example, when the entire bandwidth of the system is represented by SysBW, frequency intervals are determined as shown in equation 2.

$$b[i]=(SysBW-BW)/n, \text{ where } i=1,2,\ldots,n-1$$
$$(n \geq \text{threshold}) \quad \text{(Equation 2)}$$

In contrast, when the number of SD's is less than a threshold, frequency interval determining section 156 determines frequency intervals that enable frequency scheduling gain to be maximized, based on mobile station channel quality information. That is, determined frequency intervals are not necessarily the same.

Figure 8:
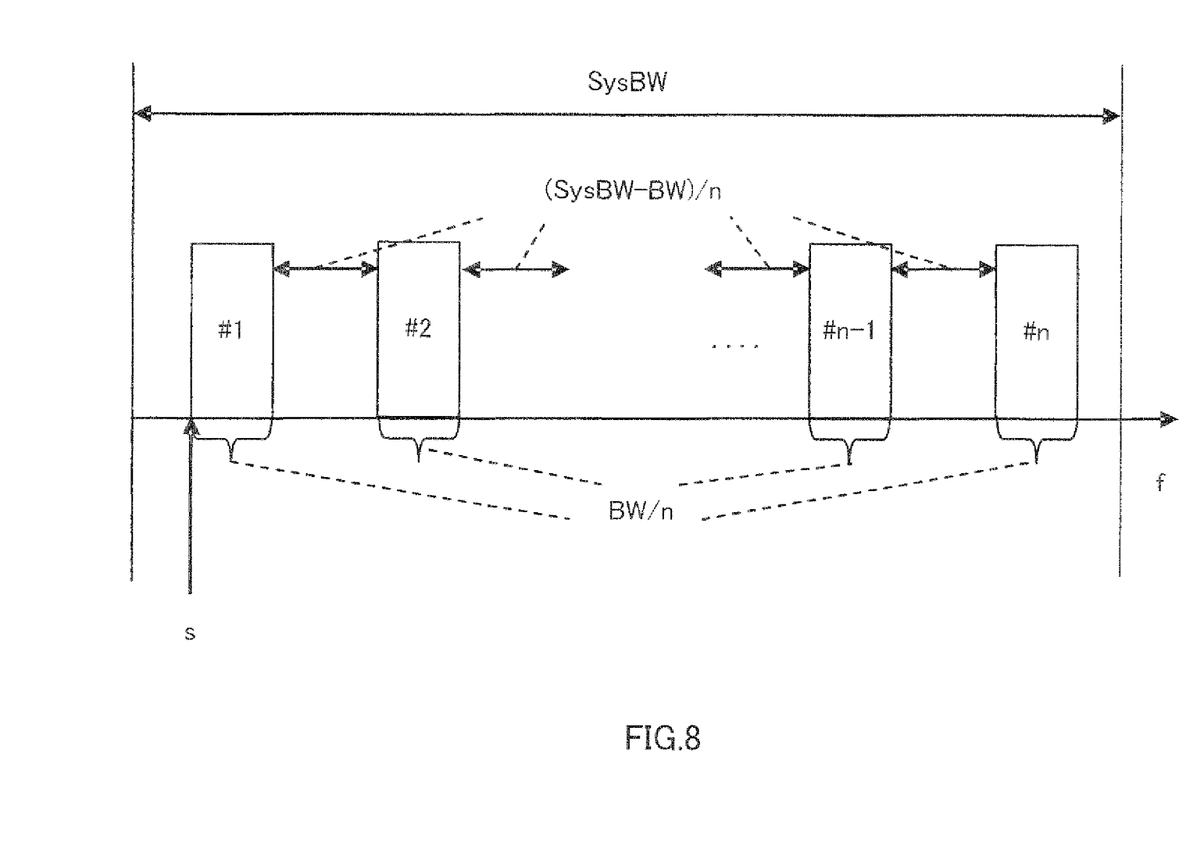
FIG. 8 shows a state where frequency is assigned when the number of SD's is equal to or greater than a threshold.

As described above, scheduling section 108 outputs the number of SD's, the frequency intervals, the division bandwidths and the allocation starting position as data allocation information. As a reference, FIG. 8 shows a state where frequency is allocated when the number of SD's is equal to or greater than a threshold.

Here, the amount of signaling required to report data allocation information from a base station to a mobile station varies between a case where the number of SD's is equal to or greater than a threshold and a case where the number of SD's is less than a threshold. In a case where the number of SD's is less than a threshold, it is necessary to signal division bandwidths corresponding to the number of SD's and frequency intervals corresponding to the result of subtracting 1 from the number of SD's. In contrast, in a case where the number of SD's is equal to or greater than a threshold, it is necessary to signal only one value for division bandwidths and only one value for frequency intervals. Therefore, by changing a signaling format of data allocation information according to whether the number of SD's is equal to or greater than a threshold or the number of SD's is less than a threshold, it is possible to reduce the amount of signaling from a base station to a mobile station.

Figure 9:
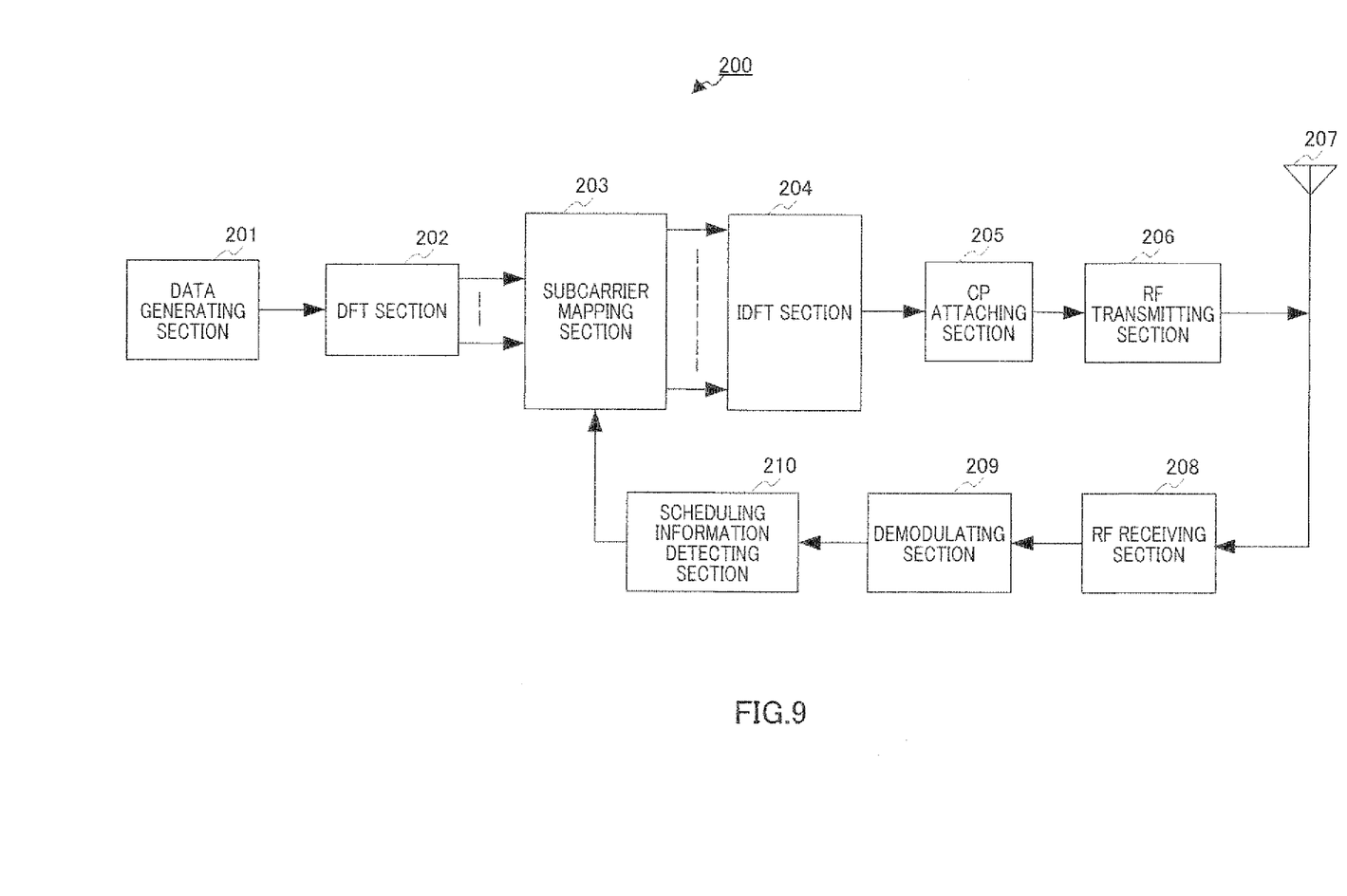
FIG. 9 is a block diagram showing a configuration of a mobile station according to Embodiment 1 of the present invention.

FIG. 9 is a block diagram showing a configuration of mobile station 200 according to Embodiment 1 of the present invention. The configuration of mobile station 200 will be explained using FIG. 9.

Data generating section 201 generates data to be transmitted by mobile station 200 and outputs the generated data to DFT section 202.

DFT section 202 performs DFT processing of the data outputted from data generating section 201 and outputs the result to subcarrier mapping section 203.

Subcarrier mapping section 203 maps the data outputted from DFT section 202 in the frequency domain, based on data allocation information outputted from scheduling information detecting section 210 (which will be described later), and outputs the result to IDFT section 204.

IDFT section 204 performs IDFT processing of the frequency domain signal outputted from subcarrier mapping section 203 to convert the signal into a time domain signal, and outputs the time domain signal to CP attaching section 205.

CP attaching section 205 copies part of the frame tail end of the signal outputted from IDFT section 204, as a CP, and attaches the CP to the frame head of the signal. The signal with a CP is outputted to RF transmitting section 206.

RF transmitting section 206 performs transmission processing such as D/A conversion, amplification and up-conversion on the signal outputted from CP attaching section 205, and outputs the result from antenna 207 to base station 100.

RF receiving section 208 receives a signal transmitted from base station 100, via antenna 207, performs reception processing such as down-conversion and A/D conversion on the received signal and outputs the result to demodulating section 209.

Demodulating section 209 performs equalization processing and demodulation processing on the signal outputted from RF receiving section 208 and outputs the demodulation result to scheduling information detecting section 210.

Scheduling information detecting section 210 detects scheduling information indicated by the base station, from the signal outputted from demodulating section 209, and outputs data allocation information included in the detected scheduling information to subcarrier mapping section 203. Also, as described above, when the signaling format of data allocation information changes according to whether the number of SD's is equal to or greater than a threshold or the number of SD's is less than a threshold, scheduling information detecting section 210 needs to decide the signaling format based on the SD account and threshold, and obtain data allocation information.

Thus, according to Embodiment 1, when the number of SD's is equal to or greater than a threshold, it is possible to suppress an increase in CM and improve the frequency diversity effect by performing uniform allocation of transmission data in the frequency domain, and, when the number of SD's is less than a threshold, it is possible to secure the degree of freedom of frequency allocation and improve the frequency scheduling effect by performing nonuniform allocation of transmission data in the frequency domain.

Embodiment 2

Figure 10:
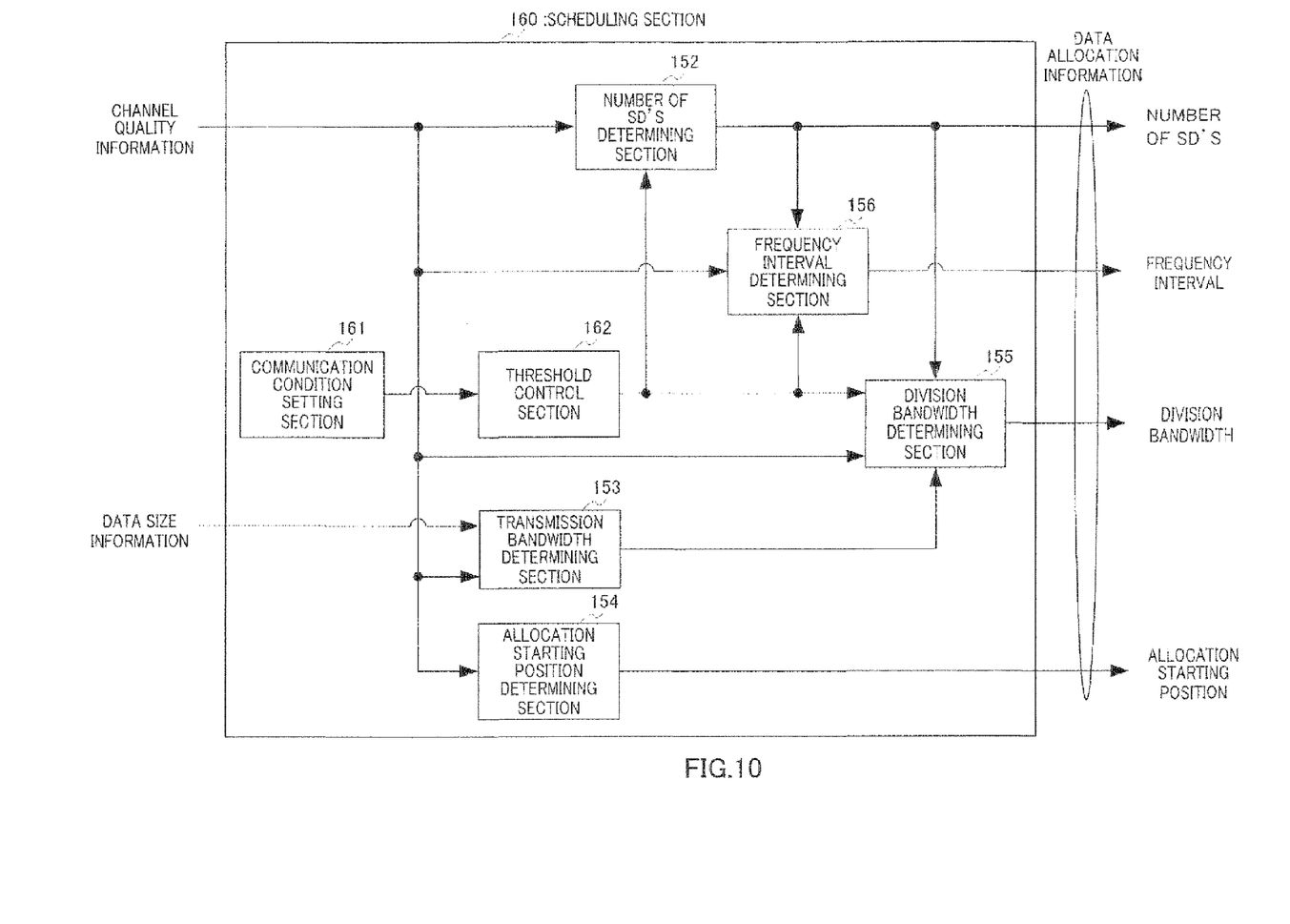
FIG. 10 is a block diagram showing a configuration inside a scheduling section according to Embodiment 2 of the present invention.

The configuration of a base station according to Embodiment 2 of the present invention is the same as the configuration shown in FIG. 3 of Embodiment 1 except for part of functions, and therefore the different functions will be explained using FIG. 3. FIG. 10 is a block diagram showing the configuration inside scheduling section 160 according to Embodiment 2 of the preset invention. FIG. 10 differs from FIG. 7 in adding communication condition setting section 161 and replacing threshold setting section 151 with threshold control section 162.

Communication condition setting section 161 acquires communication conditions of mobile stations such as: a PHR (Power HeadRoom) indicating a margin of the transmission power of a mobile station (i.e. possible increase in power); presence or non-presence of stream multiplexing before a transmission power amplifier; the modulation scheme of transmission data; and the transmission bandwidth of transmission data, and outputs the communication conditions to threshold control section 162.

Threshold control section 162 controls a threshold based on mobile station communication conditions outputted from communication condition setting section 161. A method of controlling the threshold in each mobile station communication condition will be explained below.

Figure 11:
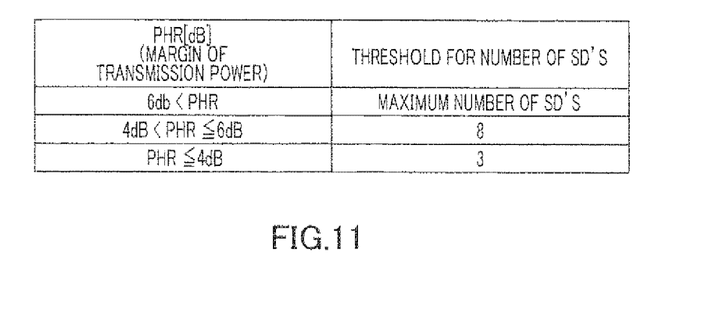
FIG. 11 illustrates a table showing the relationship between PHR of a mobile station and a threshold.

First, a case will be explained where a threshold is controlled based on the mobile station PHR. In this case, assume that threshold control section 162 has the table shown in FIG. 11. In FIG. 11, the maximum number of SD's means the maximum value of the number of SD's that can be set in the system. That is, when the maximum number of SD's is set as a threshold, it means that it is possible to freely allocate transmission data into the frequency domain in all number of SD's.

When the mobile station PHR is larger (i.e. when there is a larger transmission power margin), threshold control section 162 increases a threshold according to the table shown in FIG. 11 and widens the range of the number of SD's to freely allocate transmission data in the frequency domain. In a mobile station of a large PHR, the transmission power level does not decrease even if CM of transmission data is large, which improves the degree of freedom of allocation and improves throughput performance.

In contrast, when the mobile station PHR is smaller (i.e. when there is no transmission power margin), threshold control section 162 decreases a threshold according to the table shown in FIG. 11 and widens the range of the number of SD's to perform uniform allocation. Mobile stations of a low PHR are influenced by increased CM of transmission data and have a lower transmission power level, and, consequently, the range to apply uniform allocation to is widened to suppress an increase in CM.

Figure 12:
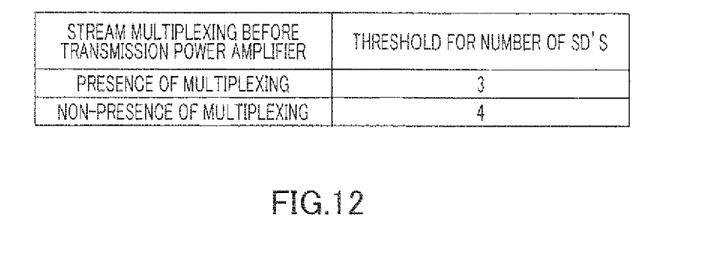
FIG. 12 illustrates a table showing the relationship between a threshold and presence or non-presence of stream multiplexing before a transmission power amplifier.

Next, a case will be explained where a threshold is controlled according to whether or not there is stream multiplexing before a transmission power amplifier. In this case, assume that threshold control section 162 has the table shown in FIG. 12. In a case where there is stream multiplexing before a transmission power amplifier, threshold control section 162 decreases a threshold and widens the range of the number of SD's to perform uniform allocation, compared to a case where there is no stream multiplexing. In the DFT-s-OFDM configuration, CM increases if stream multiplexing is performed before a transmission power amplifier, and, consequently, the range to apply uniform allocation to is widened to suppress an increase in CM.

Figure 13:
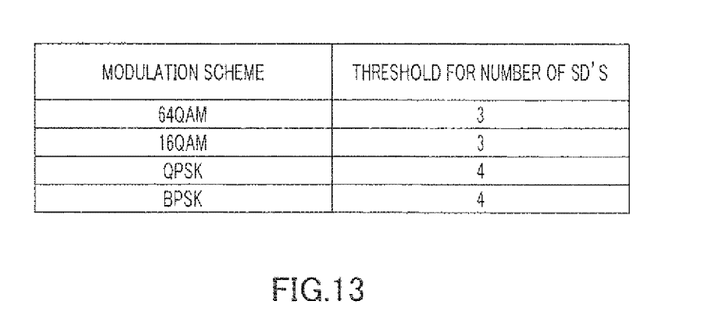
FIG. 13 illustrates a table showing the relationship between a modulation scheme of transmission data and a threshold.

Next, a case will be explained where a threshold is controlled based on the modulation scheme of transmission data. In this case, assume that threshold control section 162 has the table shown in FIG. 13. In a case where the modulation scheme is M-ary modulation such as 16 QAM and 64 QAM, compared to BPSK and QPSK, threshold control section 162 decreases a threshold and widens the range of the number of SD's to perform uniform allocation. In a case of performing M-ary modulation, CM increases compared to BPSK and QPSK, and, consequently, the range to apply uniform allocation to is widened to suppress an increase in CM.

Figure 14:
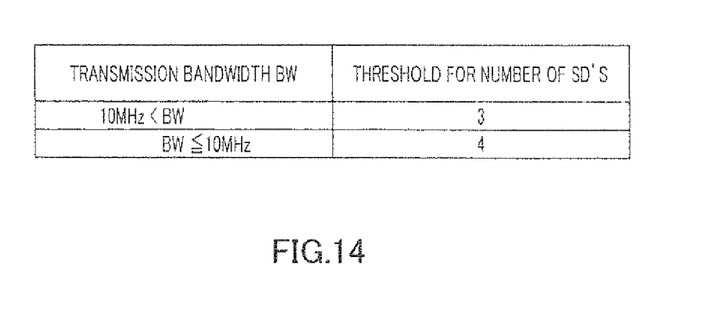
FIG. 14 illustrates a table showing the relationship between the transmission bandwidth of transmission data and a threshold.

Next, a case will be explained where a threshold is controlled based on the transmission bandwidth of transmission data. In this case, assume that threshold control section 162 has the table shown in FIG. 14. When the transmission bandwidth is larger, threshold control section 162 decreases a threshold and widens the range of the number of SD's to perform uniform allocation. In a case where the transmission bandwidth is large, even if the data allocation method is limited to uniform allocation, frequency diversity gain is sufficiently provided, so that reception performance is less degraded. Therefore, reception performance is maintained and an increase in CM is suppressed.

Thus, according to Embodiment 2, by controlling a threshold based on communication conditions of mobile stations such as the mobile station PHR, presence or non-presence of stream multiplexing before a transmission power amplifier, the modulation scheme of transmission data and the transmission bandwidth of transmission data, it is possible to allocate frequency according to the communication conditions of mobile stations, so that it is possible to suppress an increase in CM and secure the degree of freedom of frequency allocation.

Embodiment 3

The configuration of a base station according to Embodiment 3 of the present invention is the same as in FIG. 3 and FIG. 7 of Embodiment 1 except for part of functions, and therefore the different functions will be explained using FIG. 3 and FIG. 7.

In FIG. 7, when the number of SD's is equal to or greater than a threshold, frequency interval determining section 156 sets the same frequency interval (uniform allocation) up to Y % of the total power of transmission data (e.g. the threshold is set in advance based on an acceptable CM value like Y=85%). In the remaining (100−Y %) transmission data, a different frequency interval is set. As a different frequency interval, "−" or "0" may be set.

Figure 15:
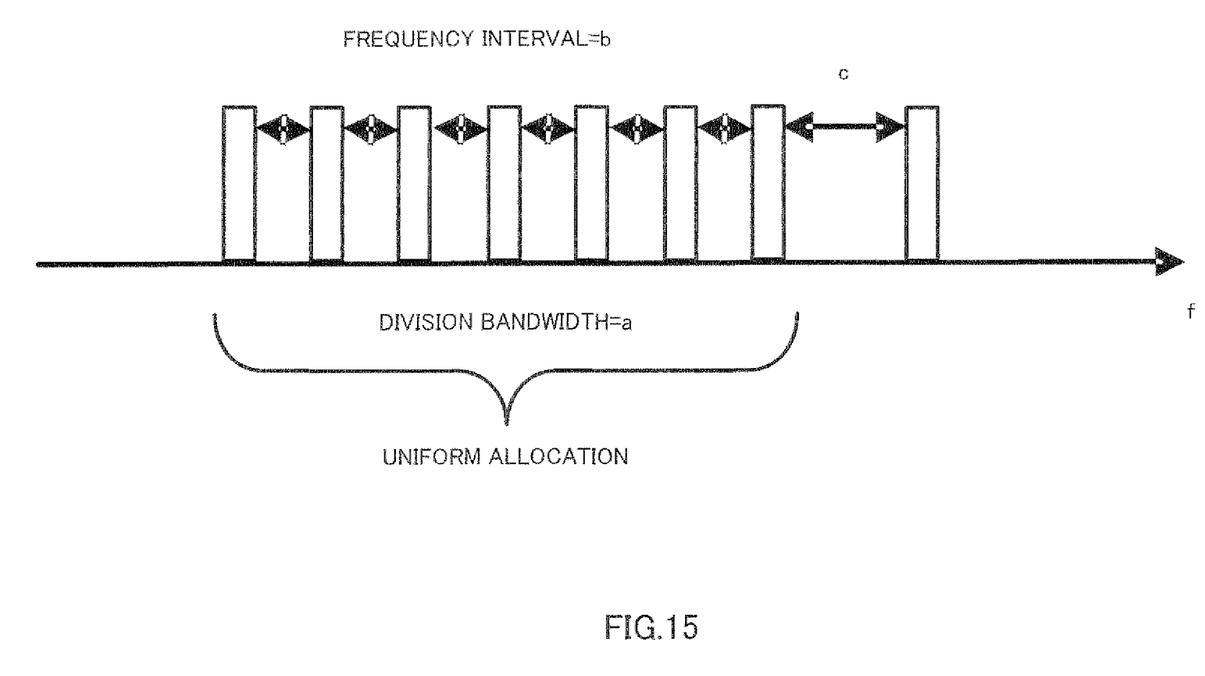
FIG. 15 shows a state of nonuniform allocation in part of transmission data.

As shown in FIG. 15, even if nonuniform allocation is provided in part of transmission data, the increment in CM is small. According to the computer simulation implemented by the present inventors, when the number of SD's is 8, CM is 2.2 dB in the case of uniform allocation. As shown in FIG. 15, CM is 2.7 dB in a case where the frequency interval is changed only in one division band, and CM is 3.4 dB in a case where all frequency intervals are changed. That is, even if nonuniform allocation is provided in part of transmission data, it is possible to suppress the increment in CM.

By this means, in a case where it is difficult to allocate transmission data at the same frequency intervals, for example, in a case where other mobile stations occupy a frequency domain in a fixed manner, a partly different frequency interval is set to avoid other mobile stations. By this means, it is possible to improve the degree of freedom of allocation into the frequency domain.

Thus, according to Embodiment 3, when the number of SD's is equal to or greater than a threshold, by performing nonuniform allocation in part of transmission data according to certain conditions, it is possible to improve the degree of freedom of frequency allocation and improve the throughput.

Although example cases have been described with the above embodiments where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

Although the present invention has been described above with embodiments using antennas, the present invention is equally applicable to antenna ports.

An antenna port refers to a theoretical antenna comprised of one or a plurality of physical antennas. That is, an antenna port does not necessarily represent one physical antenna, and may represent an antenna array comprised of a plurality of antennas.

For example, 3 GPP LTE does not define how many physical antennas an antenna port is formed with, bit defines that an antenna port is the minimum unit for transmitting different reference signals in a base station.

Also, an antenna port may be defined as the minimum unit for multiplication of precoding vector weighting.

The disclosure of Japanese Patent Application No. 2008-162091, filed on Jun. 20, 2008, including the specification, drawings and abstract, is incorporated herein by reference in its entirety.

INDUSTRIAL APPLICABILITY

The radio transmission apparatus and the radio transmission method according to the present invention are applicable to, for example, a base station apparatus in a mobile communication system.

The invention claimed is:

1. A radio transmission apparatus comprising:
 a scheduling section that determines, based on a channel quality, a number of divisions into which transmission data of a communicating party is divided, and allocates frequencies to which the divisions are respectively mapped in a discrete Fourier transform spread orthogonal frequency division multiple access scheme, and generates allocation information indicating the allocated frequencies; and
 a transmission section that transmits the generated allocation information, wherein:
 said scheduling section (i) allocates the frequencies under a condition that bandwidths of the frequencies are all equal and intervals between the frequencies are all equal, when the number of the divisions is equal to or greater than a threshold, and (ii) allocates the frequencies without the condition, when the number of the divisions is less than the threshold.

2. The radio transmission apparatus according to claim 1, wherein the scheduling section comprises a threshold setting section that sets "3" as the predetermined threshold.

3. The radio transmission apparatus according to claim 1, wherein the scheduling section comprises a control section that controls the threshold according to a communication condition of the communicating party.

4. The radio transmission apparatus according to claim 3, wherein the control section increases the threshold when a power head room of the communicating party is larger.

5. A radio transmission apparatus comprising:
 a scheduling section that allocates frequency such that a plurality of bandwidths of division bands to divide and allocate transmission data of a communicating party in a frequency domain, are all equal, and intervals between the plurality of the division bands are all equal, when a number of the division bands is equal to or greater than a threshold in a discrete Fourier transform spread orthogonal frequency division multiple access scheme, and generates data allocation information including an allocation result; and a transmission section that transmits the generated data allocation information, wherein the scheduling section comprises a control section that controls the threshold according to a communication condition of the communicating party, and wherein the control section sets the threshold smaller when the communicating party performs stream multiplexing before a transmission power amplifier than when the communicating party does not perform stream multiplexing before the transmission power amplifier.

6. The radio transmission apparatus according to claim 3, wherein the control section sets the threshold smaller when the communicating party uses M-ary modulation for transmission data than when the communicating party does not use M-ary modulation.

7. The radio transmission apparatus according to claim 3, wherein the control section sets the threshold smaller when a transmission bandwidth of transmission data to be transmitted by the communicating party is larger.

8. The radio transmission apparatus according to claim 1, wherein the scheduling section allocates the frequencies to transmission data in which a proportion of total power over the transmission data is equal to or greater than a predetermined value.

9. A radio transmission method comprising:

determining, based on a channel quality, a number of divisions, into which transmission data of a communicating party is divided; and allocating frequencies to which the divisions are respectively mapped in a discrete Fourier transform spread orthogonal frequency division multiple access scheme, wherein:

(i) the frequencies are allocated under a condition that bandwidths of the frequencies are all equal and intervals between the frequencies are all equal, when the number of the divisions is equal to or greater than a threshold, and (ii) the frequencies are allocated without the condition, when the number of the divisions is less than the threshold.

\* \* \* \* \*